Jan. 27, 1948.  G. A. FRY  2,435,074
CONTRAST MEASURING DEVICE
Filed June 20, 1945

Inventor
Glenn A. Fry

By J. H. Church & H. E. Thibodeau
Attorneys

Patented Jan. 27, 1948

2,435,074

UNITED STATES PATENT OFFICE 2,435,074

CONTRAST MEASURING DEVICE

Glenn A. Fry, Columbus, Ohio, assignor to the United States of America, as represented by the Secretary of War Application June 20, 1945, Serial No. 600,515

3 Claims. (Cl. 88—23)

This invention relates to a device for use with telescopes, microscopes, and terrascopes, for measuring the contrast between an object or target, such as an aeroplane, and its unrestricted uniform background, provided by the sky.

More particularly, it is an aim of the invention to provide an improved construction of reticle for use in conjunction with the tracking telescope of an M2 height finder for measuring the contrast between an aerial target toward which the telescope is directed and its sky background by matching the contrast of the target with areas of the reticle, of varying hues, for ascertaining the area which most nearly matches the contrast of the target, to thus provide a measurement of the contrast.

More particularly it is an aim of the invention to provide an improved construction of reticle for use in optical instruments of the type previously referred to, and which includes a sheet of photographic film having areas of different densities photographically produced thereon and including a clear area, through which the target can be viewed, so that the contrast of the target can be compared with said photographically produced areas of varying densities.

Other objects and advantages of the invention will hereinafter become more fully apparent from the following description of the drawing, which illustrates a preferred embodiment thereof, and wherein.

Figure 1:
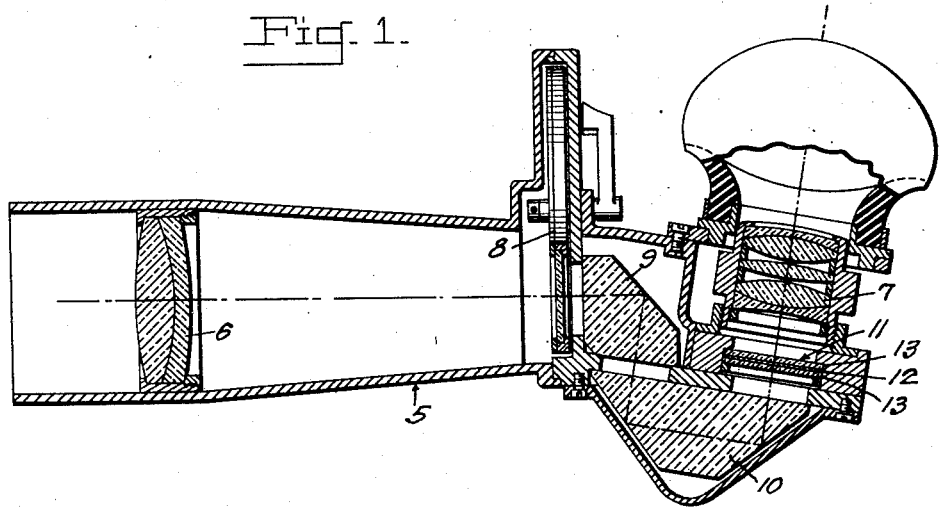
Figure 1 is a longitudinal, substantially central sectional view, partly in side elevation, of an elbow tracking telescope M13, which is employed as a part of a height finder M2, and to which the invention is shown applied.
Figure 2:
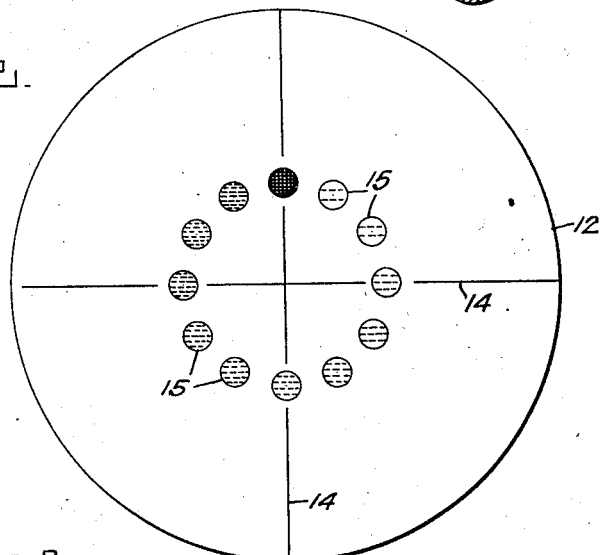
Figure 2 is a plan view of the photographic film, forming one ply of the reticle of the telescope.
Figure 3:
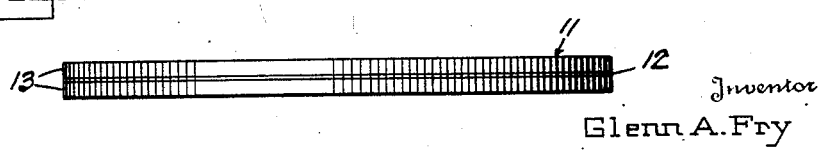
Figure 3 is an edge view in elevation of the assembled reticle.

Referring more particularly to the drawing, wherein like reference characters designate like or corresponding parts throughout the several views, for the purpose of illustrating one application of the invention, an elbow tracking telescope M13 is shown in Fig. 1 and designated generally 5 and is provided adjacent one end thereof with an objective lens 6. The telescope 5 is provided with an eye-piece 7, adjacent its opposite end and with a filter holder 8, intermediate of its ends or between the objective lens 6 and the eye-piece 7. Between the eye-piece 7 and the filter holder 8 the telescope is provided with a roof prism 9 and a porro prism 10, the latter being located between the roof prism and the eye-piece. Between the porro prism and the eye-piece, and in the focal plane of the objective lens 6, is located the improved reticle designated generally 11, and comprising the invention.

The reticle 11 includes a disc 12 of photographic film and two corresponding transparent discs 13, preferably formed of clear glass and between which the sheet of photographic film 12 is disposed. The film 12 has cross or reticle lines 14 photographically produced thereon and in addition is provided with twelve areas 15 of varying densities which are photographically produced thereon. The areas 15 are preferably circular to assume the form of spots or discs on the film 12 and are also preferably arranged to form a circle with the individual areas 15 circumferentially spaced from one another. Preferably, the areas 15 are of progressively increasing densities from a one-o'clock position clockwise around the circle, formed by the said areas 15. The lines 14 intersect at the center of the film disc 12 and preferably at the center of the circle formed by the areas 15. Except for the lines 14 and the areas 15, the film disc 12 is uniformly clear. The densities of the different areas 15 are controlled by variations in exposure to produce any desired gradations in contrast for the various areas 15.

Light rays from the objective lens enter the front face of the roof prism and undergo reflection at the two roof surfaces, and emerge from the bottom face and enter the porro prism directly below. From here the light rays are twice reflected and then enter the eye-piece. The inverted image of the object or target, formed by the objective lens, is inverted in its passage through the prism system so that an erect image of the target is seen through the eye-piece. The reticle 11 is located in the focal plane of the objective lens and the eye-piece 7 and the image seen through the eye-piece 7 appears in the center of the film disc 12 or within the circle formed by the areas 15. Assuming that the telescope is directed toward a distant object having an unrestricted uniform background, such as an aeroplane with a sky background, so that the image of the target falls at the center of the film disc 12, the contrast of the image is measured by comparing the contrast of the target to the various areas 15. The area 15 that most closely matches the contrast of the target represents the measure of the contrast. Thus, the improved reticle 11 provides a very simple means whereby, through the utilization of a plurality of relatively small areas of varying densities, a direct comparison of a target, whose contrast is being measured, with the various areas can be obtained. Any suitable system of calibrations or graduations could be utilized in conjunction with the areas 15 for transmitting or recording the contrast measurement which is obtained.

Various modifications and changes in the construction and arrangement of the parts forming the invention are contemplated and may obviously be resorted to, without departing from the spirit and scope of the invention hereinafter defined by the appended claims, as only a preferred and very simple embodiment of the invention has been disclosed.

I claim:

1. In a telescope having an eye lens and an objective collectively defining an optical axis, a transparent disc mounted in the focal plane of said eye lens with its center on said axis and through which a remote object is viewable when looking into said eye lens, said disc having outlined thereon a plurality of discrete areas regularly spaced about the circumference of a circle having its center at the center of said disc, said areas, beginning with a predetermined one, being of successively increasing density, all of said areas being viewable in the field of view of said telescope simultaneously with said remote object.

2. In a telescope having an eye lens and an objective collectively defining an optical axis, a transparent disc fixed between said eye lens and said objective in the focal plane of said objective, said disc having defined thereon discrete circular areas equally spaced about the circumference of a circle having its center at the intersection of said axis with said disc, said areas being of successively increasing density from one said area in one direction of progression about said circle, all said areas being simultaneously viewable in said eye lens, together with an image of a remote object.

3. In combination with a telescope having an eye lens and an objective collectively defining an optical axis, a transparent disc fixed in said telescope in the focal plane of said objective, said disc having defined thereon twelve discrete circular areas regularly spaced about the circumference of a circle having its center on said optical axis, said areas being positioned to correspond respectively with the hour numerals of a clock when simultaneously viewed in the field of view of said telescope, said areas progressively increasing in density from the one o'clock position clockwise to the twelve o'clock position, the gamut of the densities of said areas covering the range of apparent densities of remote objects viewed through said telescope simultaneously with said areas.

GLENN A. FRY.

REFERENCES CITED

The following references are of record in the file of this patent:

UNITED STATES PATENTS

| Number | Name | Date |
|---|---|---|
| 806,392 | Bolton | Dec. 5, 1905 |
| 1,419,385 | Kellogg | June 13, 1922 |
| 1,460,055 | Drew | June 26, 1923 |
| 1,870,464 | Ramsey | Aug. 9, 1932 |
| 2,042,049 | Heidenhain | May 26, 1936 |
| 2,350,237 | Kende et al. | May 30, 1944 |
| 2,357,913 | Sigford | Sept. 17, 1944 |

FOREIGN PATENTS

| Number | Country | Date |
|---|---|---|
| 496,318 | Great Britain | Nov. 29, 1938 |
| 61,215 | Switzerland | May 17, 1912 |
| 350,236 | Germany | Mar. 16, 1922 |